United States Patent
Richardson

(10) Patent No.: US 8,808,528 B2
(45) Date of Patent: Aug. 19, 2014

(54) ELECTROLYTE SUPPLY TANKS AND BUBBLER TANKS HAVING IMPROVED GAS DIFFUSION PROPERTIES FOR USE IN ELECTROLYZER UNITS

(76) Inventor: David Thomas Richardson, Draper, UT (US)

( * ) Notice: Subject to any disclaimer, the term of this patent is extended or adjusted under 35 U.S.C. 154(b) by 235 days.

(21) Appl. No.: 13/483,028

(22) Filed: May 29, 2012

(65) Prior Publication Data

US 2012/0298521 A1 Nov. 29, 2012

Related U.S. Application Data

(60) Provisional application No. 61/490,582, filed on May 26, 2011.

(51) Int. Cl.
*C02F 1/46* (2006.01)
*C25B 1/04* (2006.01)

(52) U.S. Cl.
USPC ............ 205/628; 204/266; 204/270; 204/278

(58) Field of Classification Search
USPC ................... 205/628–639; 204/266, 270, 278
See application file for complete search history.

(56) References Cited

U.S. PATENT DOCUMENTS 4,075,069 A * 2/1978 Shinohara et al. ............ 205/560

* cited by examiner

*Primary Examiner* — Arun S Phasge
(74) *Attorney, Agent, or Firm* — Angus C. Fox, III

(57) ABSTRACT

Electrolyte supply tanks and bubbler tanks for oxyhydrogen gas generation systems are provided which eliminate the introduction of electrolyte and water into the induction systems of internal combustion engines. Both types of tanks are equipped with porous polyethylene gas diffusers which break up incoming gas into microscopic bubbles, thereby facilitating the absorption of electrolyte mist and droplets returning to the electrolyte supply tank and minimizing splashing of incoming gas in bubbler tanks. Air diffusers having an average pore diameter of about 70 μm are installed near the bottom of the electrolyte supply tanks, while air diffusers having an average pore diameter of about 35 μm are installed near the bottom of the bubbler tanks.

17 Claims, 4 Drawing Sheets

ELECTROLYTE SUPPLY TANKS AND BUBBLER TANKS HAVING IMPROVED GAS DIFFUSION PROPERTIES FOR USE IN ELECTROLYZER UNITS

This application has a priority date based on the filing of Provisional Patent Application No. 61/490,582, titled Electrolyte Supply Tanks and Bubbler Tanks Having Improved Gas Diffusion Properties for Use in Electrolyzer Units, by the same inventor, on May 26, 2012.

BACKGROUND OF THE INVENTION

1. Field of the Invention

The present invention is related to an apparatus and method of improving the fuel efficiency of an internal combustion engine, and in particular, to an apparatus and method for hydrolyzing water into a mixture comprising hydrogen gas and oxygen gas, which is combined with the fuel and air mixture used in an internal combustion engine.

2. History of the Prior Art

During the past 30 years, significant advances have been made in internal combustion engine technology that have dramatically improved the efficiency of internal combustion engines. For gasoline engines, four-valve-per-cylinder combustion chamber designs, coupled with computer monitoring of the combustion process and computer control of both valve timing and fuel injection, have resulted in significant gains in fuel economy. Whereas in the 1950s and 1960s, two and three-speed automatic transmissions were 10 to 20 percent less efficient than manual transmissions, the computer-controlled, six and seven-speed automatic transmissions of the twenty-first century are, typically, more efficient than manual transmissions. Although added weight from new safety features and a host of accessories that have become "essential" have somewhat reduced the effect of gains in drivetrain efficiency, a large percentage of the gain in efficiency has been applied by vehicle manufacturers to engine power output. The result has been very little overall increase in corporate average fuel efficiency during the past 25 years.

The rapid rise of the price of crude oil between 2007 and 2008 and once again in 2011 has traumatized the transportation industry. Most global airline companies are sustaining huge operating losses because of high fuel costs, and are headed for insolvency. U.S. automobile manufacturers, who have long relied on fuel-guzzling, high-markup light trucks and SUVs for most of their profits, have watched sales of those vehicles drop precipitously. Not since the early 1970s has such an economically compelling reason existed for U.S. consumers to purchase fuel-efficient vehicles. Since the 1975, U.S. Federal regulations have attempted to pressure automobile manufacturers to improve the fuel efficiency of their corporate offerings. Although the price of crude oil has apparently peaked and is headed down, few consumers will be willing to risk purchasing a fuel-inefficient vehicle any time soon. Thus, economics may prove to be a far more effective incentive for improving the fuel efficiency of new vehicles than any government regulation.

A number of new technologies have shown great promise in enhancing the efficiency of internal combustion engines. Computer-controlled, common-rail, ultra-high-pressure direct injection designs have greatly improved the fuel economy and reduced emissions of a new generation of diesel engines. Internal combustion steam engines, which are still in the earliest stages of development, have demonstrated dramatic increases in thermal efficiency.

This patent application deals with another technology that has been shown to enhance the operational efficiency of conventional internal combustion engines operating primarily on conventional fuels such as gasoline, ethanol, and gasoline-ethanol mixtures. The technology is implemented by introducing a mixture of small quantities of hydrogen gas ($H_2$) and oxygen gas ($O_2$) (commonly called Brown's gas, HHO gas, or oxyhydrogen gas) generated by an electrolyzer into the intake manifold of the internal combustion engine. It is believed that the explosive reaction of hydrogen and oxygen in the combustion chambers of the engine promotes more complete combustion of the primary fuel, with a corresponding decrease in incomplete combustion products, such as soot and carbon monoxide. The hydrolysis of water to produced both hydrogen and oxygen gases is well known in the art. Water is, of course, a non-flammable, stable and safe compound. However, as hydrogen and oxygen gases are both unstable, highly-reactive, and—when combined—potentially explosive, utilization of hydrogen gas in vehicular applications must be undertaken with great care and intelligent equipment design.

A plethora of electrolyzers are being offered for sale on every forum imaginable, including eBay and Craig's List. A recent search for "electrolyzer" on eBay found over 100 electrolyzers of various designs for sale. A search using the descriptor "hydrogen generator" found over 1500 items for sale! Most of these electrolyzers are intended for use in vehicular applications. Many are crude, barely-usable contraptions being hocked by fast-buck artists. Others are more refined designed and include all the components required for integrating the output from the electrolyzer into the vehicle's induction system.

A major problem with associated with the current generation of electrolyzer systems is the introduction of electrolyte mist into the induction system of the equipped vehicle. Sodium hydroxide (NAOH) and potassium hydroxide (KOH) are the two most commonly used electrolytes for this application. These hydroxide compounds are deposited on the airflow mass sensor and on the inside of the intake manifold. After coating the intake manifold, these compounds coat the intake ports and the intake valves and they enter the cylinders. During the combustion process, much of the entering electrolyte compound is deposited on the surfaces of the cylinder head that form the combustion chamber, on the cylinder walls combustion chamber walls and on the top of the piston. Though the piston's compression rings tend to scrape most deposits off of the cylinder walls, aluminum surfaces on the piston and cylinder head are subject to chemical etching due to the presence of the hydroxide compounds. If the deposits become excessive, an engine tear down, cleaning, and reassembly is recommended. Such a procedure can cost thousands of dollars. Replacement of aluminum pistons may require both removal of the engine block from the vehicle and a bottom-end tear down. Damaged cylinder heads can be expensive to replace. For example, the wholesale cost of an aluminum cylinder head for the engine of a Mercedes Benz 300SDL diesel sedan is approximately $2,500.

A typical supposed remedy for eliminating the introduction of electrolyte mist into the induction system of a vehicle is to duct the generated gases from the electrolyzer unit into an electrolyte supply tank and allow the gases to bubble through the liquid electrolyte. To further enhance the process of removing electrolyte from the generated hydrogen and oxygen gases, a gas diffuser is positioned at or near the bottom of the electrolyte supply tank, and the incoming gasses are passed through the gas diffuser. The gas diffuser breaks up the incoming gases into small bubbles, thereby reducing splattering of the electrolyte solution as the rising bubbles break the surface, enabling the incoming gas to be more effectively cooled, and the electrolyte mist to be more fully absorbed into the electrolyte solution. The smaller the bubbles, the slower they rise to the surface, the greater the likelihood that electrolyte mist trapped within the bubble will be absorbed into the surrounding solution, and the faster the heat transfer from the gas into the solution. A further enhancement is to duct the gases exiting from the electrolyte supply tank into a secondary tank partially filled with pure water. A gas diffuser can be placed at the bottom of the secondary tank in order to break up the incoming gasses into small bubbles. The water in the secondary tank is discarded periodically and replaced with fresh pure water. Air diffusers that have been previously used are those which are commonly used to diffuse air introduced into fish tanks. These can take the form of perforated, soaker-hose-type tubing, as well as porous stone diffusers.

FIG. 1 shows a conventional prior art approach to minimizing the introduction of electrolyte solution into the intake manifold of an internal combustion engine. An electrolysis unit 101 is shown coupled to an electrolyte supply tank 102, which is, in turn, coupled to a bubbler tank 103. It will be noted that the gas inlet/electrolyte overflow return inlet 112 of the electrolyte supply tank 102 is coupled to the gas outlet 108 of the electrolysis unit 101 via return hose 109, and that the electrolyte outlet 113 is coupled to the electrolyte filler inlet 110 of the electrolysis unit 101 via supply hose 111. Both the gas inlet/overflow return inlet 112 and the electrolyte outlet 113 are both located near the bottom of the electrolyte supply tank 102. Projecting tabs 104 and 106 are directly coupled to the outer plates of a series-coupled seven-plate assembly with insulated cables 105 (ground) and 107 (12-volt DC), respectively. It will be noted that the electrolyte outlet 113 of the electrolyte supply tank 102 is above the level of the upper edges of the plates within the electrolysis unit 101 so that gravity can maintain the electrolysis unit filled to an optimum level. Optionally, the electrolysis unit 101 can be filled with a pump, rather than by gravity feed. It will be further noted that the electrolyte supply tank 102 is partially filed with electrolyte 115 (e.g., an aqueous solution of potassium hydroxide), that hydrogen and oxygen gases generated within the electrolysis unit 101 enter the gas inlet/overflow return inlet 112, bubble through the electrolyte 115 and accumulate in the space 116 above the electrolyte 115 before escaping through the gas outlet 114 of the electrolyte supply tank 102. The cap 117 can be removed to replenish the electrolyte 115. The gas outlet 114 is coupled to the gas inlet 119 of the bubbler tank 103 via an intermediate hose 118. The bubbler tank 103 is partially filled with pure water 120. Hydrogen and oxygen gas entering the gas inlet 119 bubbles through the water 120 and accumulates in the space 121 above the water 120 before exiting the bubbler tank 103 through gas escape fitting 123. A gas delivery hose 124 couples the escape fitting 123 to a one-way valve 125, which closes in the event a back fire causes reverse pressure. The one-way valve 125 thus prevents explosions of the hydrogen and oxygen gases within the bubbler tank 103. It should be noted that the present invention does not focus on electrolyzer design. In fact, this system can be used in combination with any electrolyzer unit.

Despite the steps taken by prior art equipment to reduce the amount of electrolyte introduced into the intake manifold of engines equipped with oxyhydrogen gas generators, there still exists a need to further improve the air-diffusion process, thereby completely eliminating the introduction of solid electrolytic into the intake manifolds of electrolyzer-equipped engines.

SUMMARY OF THE INVENTION

The present invention improves on existing technology for preventing mist containing electrolyte in solution or particle form from being introduced into the induction system of an internal combustion engine equipped with an oxyhydrogen gas generation system. The present invention utilizes gas diffusers made of porous polyethylene. A first diffuser having a pore diameter of about 70 µm is used at the bottom of the electrolyte supply tank. Oxyhydrogen gas generated by the electrolyzer is ducted into the electrolyte supply tank via the 70 µm-pore diffuser. A pore diameter of 70 µm is deemed optimum for this application because the incoming oxyhydrogen gas is typically laden with electrolyte mist and droplets. If the pore diameter is significantly smaller than 70 µm, the electrolyte mist and droplets must be forced through the pores, which severely restricts gas flow through the diffuser. A bubbler is also used in combination with a second polyethylene gas diffuser having a pore diameter of about 35 µm. The bubbler is down stream of the electrolyte supply tank. After the oxyhydrogen gas leaves the electrolyte supply tank, it is relatively free of mist and droplets. Thus, when it arrives at the entrance of the second, there is very little liquid to force through the smaller pores, which would, otherwise, restrict the flow of the entering gas. The use of these ultra-effective diffusers breaks up the flow of oxyhydrogen gas into minute bubbles. The small size of the bubbles enables any steam and trapped electrolyte to be effectively cooled and reclaimed by the solution in the electrolyte supply tank. The diffusers also provide a more uniform and consistent flow of gases into the intake manifold of the engine. The diffusers also act as filters, which remove particulate contaminants from the electrolyte solution. The diffusers are easily replaceable, and can be changed during routine maintenance of the system. Though the disclosed pore sizes for the diffusers are presently deemed to be optimum values for the application, other pore sizes may also be used with acceptable results. For example, the 70 µm pore size of the first diffuser may be increased somewhat without adverse consequences. Likewise, the 35 µm pore size of the second diffuser may also be increased somewhat.

DETAILED DESCRIPTION OF THE INVENTION

The invention will now be described in detail with reference to the attached drawing figures. It should be understood that although no attempt has been made to inaccurately portray the drawings, they still may not be drawn to scale.

The present invention is designed to eliminate virtually all electrolyte from the oxyhydrogen gas that is provided to the induction system of an internal combustion engine. The term "internal combustion engine", as used herein, refers to any engine in which a fuel-air mixture is burned within the engine itself so that the hot gaseous products of combustion act directly on the surfaces of engine's moving parts. Such moving parts include, but are not limited to, pistons or turbine rotor blades. Internal-combustion engines include spark-ignition and compression-ignition engines of both two-stroke and four-stroke cycle types, gas turbine engines, jet engines, and rocket engines.

Figure 2:
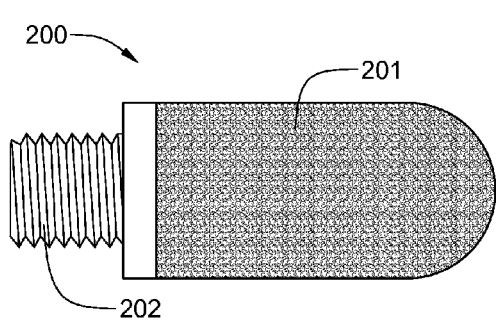
FIG. 2 is a plan view of a porous polyethylene air diffuser.

Referring now to FIG. 2, a porous polyethylene air diffuser 200 is shown. Such an air diffuser is available from Alita Industries, a company having manufacturing facilities at No. 45, Ln. 20, Sec. 1, Wenhua 2nd Rd., Linkou Dist., New Taipei City 24448, Taiwan, R.O.C. and worldwide distribution in Arcadia, Calif. 91066-0923. Such air diffusers are available in a variety of sizes and in three levels of porosity (20, and 70 μm). For a preferred embodiment of the invention, model PES-38 are used for both the electrolyte supply tank 102 and the bubbler tank 103. This model air diffuser has a total length of about 69 mm, a diffuser body 201 having a length of about 53 mm and a diameter of about 25 mm, and a connection fitting 202 with a ⅜-inch pipe thread. Because electrolyte is constantly returning to the electrolyte supply tank 102, a PES-38 with a 70 μm average pore diameter is used at the entrance of the electrolyte supply tank 102, while a PES-38 with a 35 μm average pore diameter is used at the entrance of the bubbler tank 103.

Figure 3:
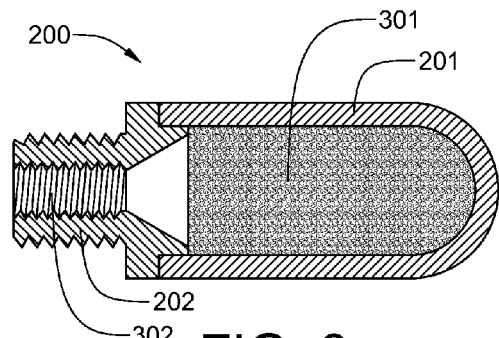
FIG. 3 is a cross-sectional view of the porous polyethylene air diffuser of FIG. 2, taken through the central axis thereof.

Referring now to the cross-sectional view of the air diffuser 200 of FIG. 3, it will be noted that the diffuser body 201 has a hollow interior 301. It will be further noted that the connection fitting 202 has been equipped with internal threads 302, which accept a ¼-inch pipe fitting. The internal threading of the connection fitting 202 is a modification of the stock PES-38 air diffuser.

Figure 4:
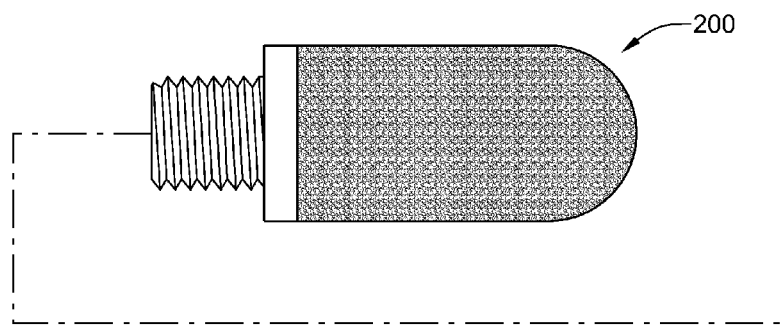
FIG. 4 is an exploded view of the porous polyethylene air diffuser of FIG. 2 and a section of pipe, one end of which is threaded and the other end of which has attached thereto a flexible hose.
Figure 4:
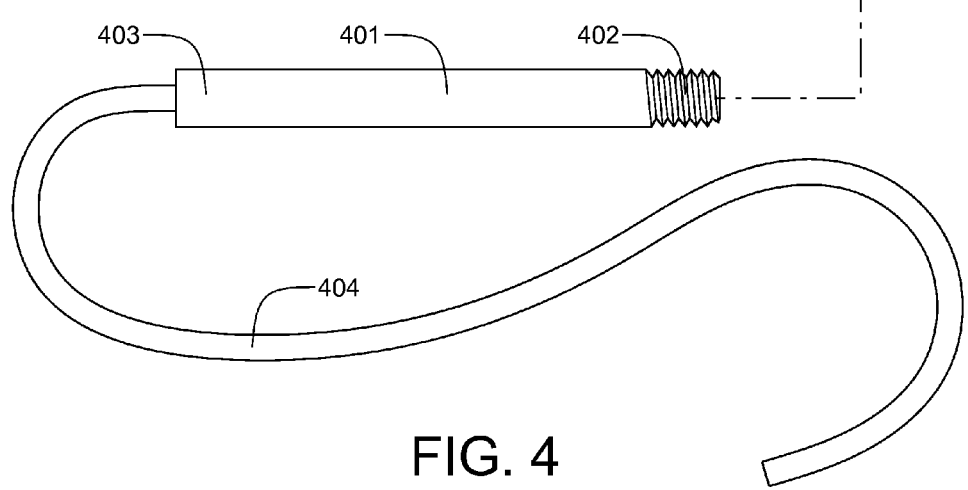

Referring now to FIG. 4, a porous polyethylene air diffuser 200 is shown in combination with a piece of pipe 401 having one threaded end 402 and an unthreaded end 403. A length of flexible tubing 404 has been forced into the aperture at the unthreaded end 403 of the piece of pipe 401. With the piece of pipe 401 threadably inserted into the connection fitting 202, and the flexible tubing 404 attached to the piece of pipe 401, the assembly can be threaded into a threaded aperture from the inside of an electrolyte supply tank 102 or a bubbler tank 103. Once the flexible tubing 404 is pulled through the threaded aperture, the piece of pipe 401 can be axially rotated in a counterclockwise direction in order to secure the air diffuser 200 within the interior of the electrolyte supply tank 102 or the bubbler tank 103.

Figure 1:
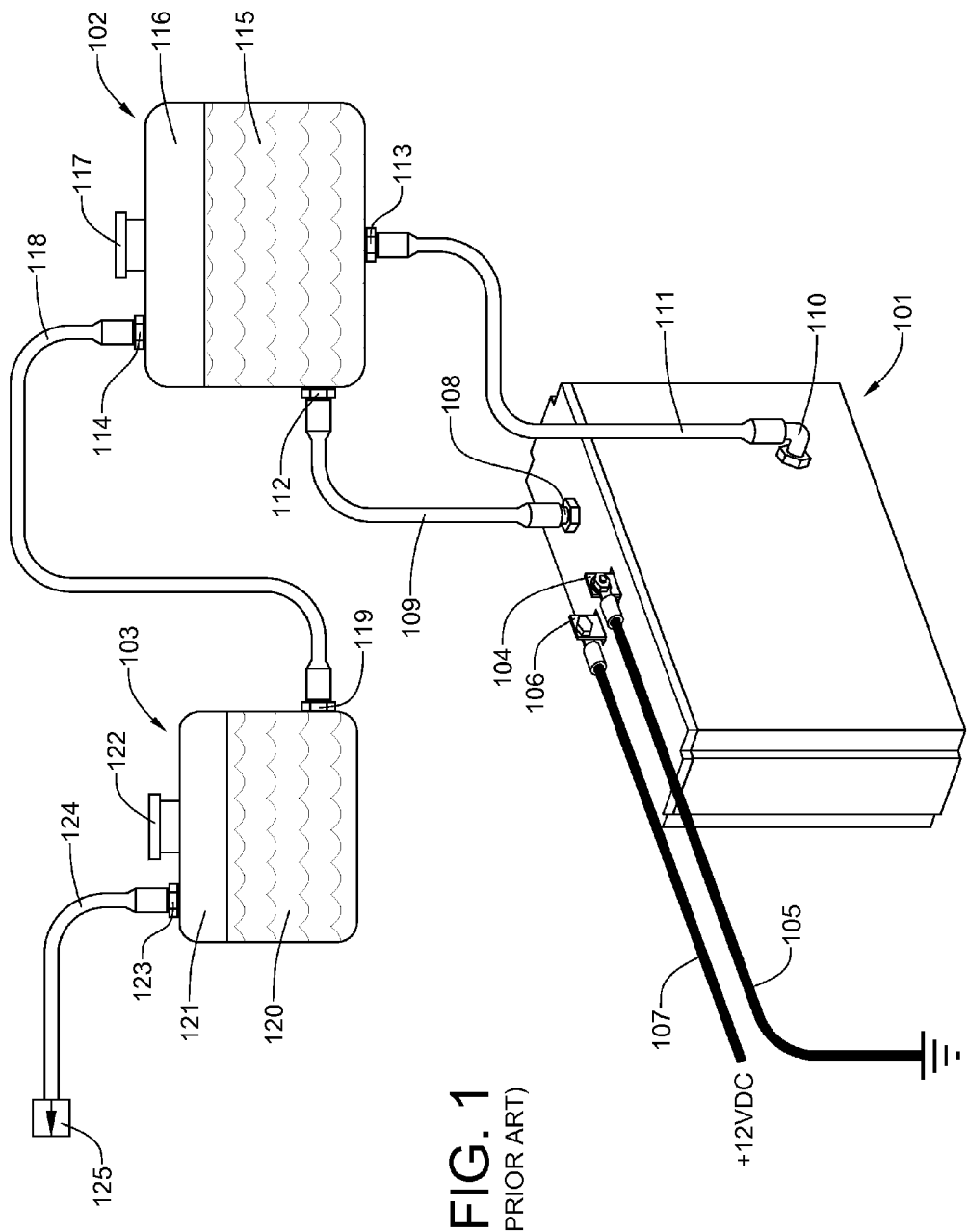
FIG. 1 is an isometric and elevational diagramatic view of a prior art of an oxyhdrogen gas generator interconnected with an electrolyte supply tank and a bubbler tank.
Figure 5:
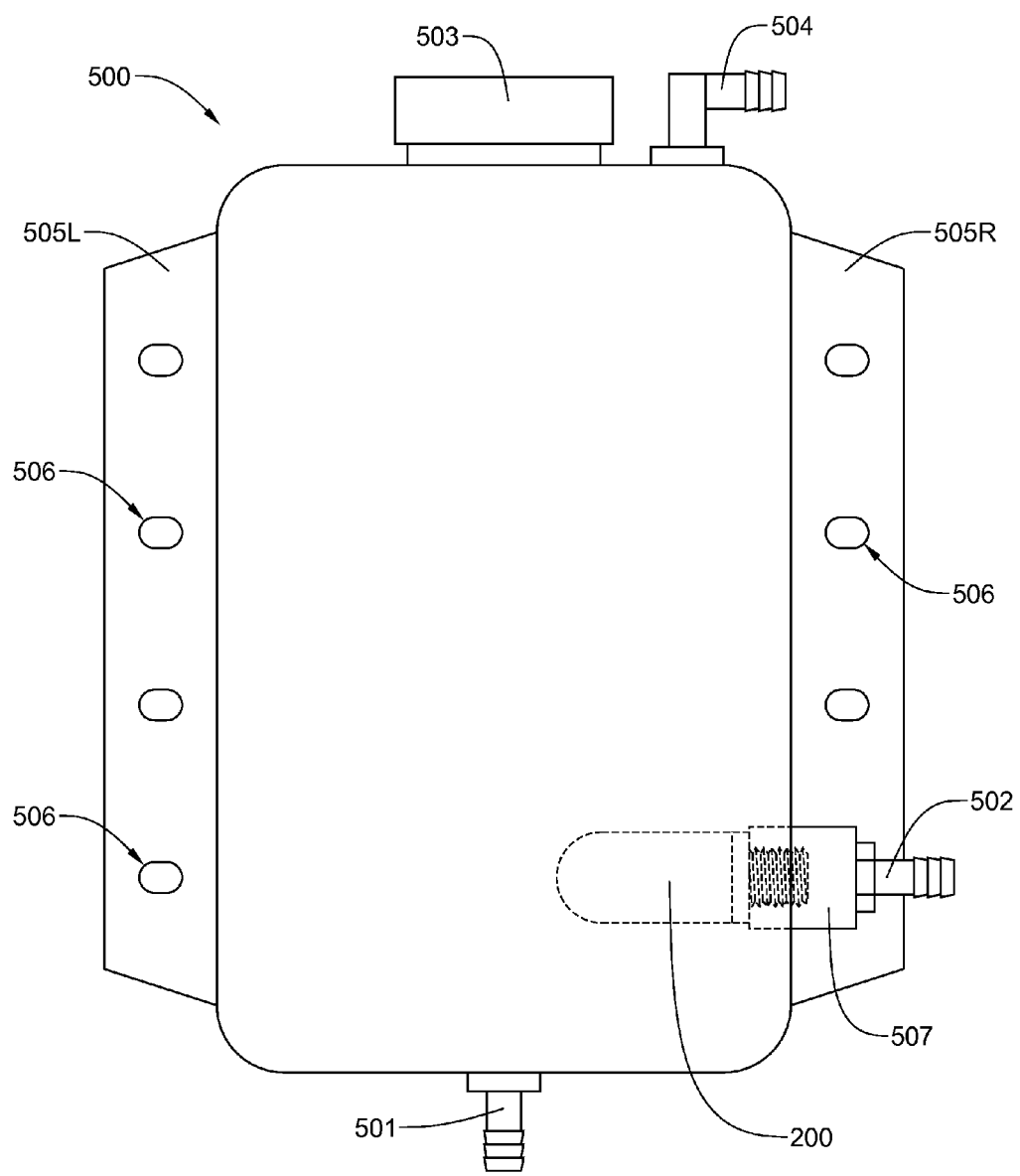
FIG. 5 is an elevational view of an electrolyte supply tank in which the porous polyethylene air diffuser of FIG. 2 has been installed.

Referring now to FIG. 5, a first high-density polyethylene tank 500 is configured as an electrolyte supply tank. The bottom fitting 501 is the electrolyte outlet, and it is the equivalent of the electrolyte outlet 113 of FIG. 1. The lower-right fitting 502 is the gas inlet/overflow return inlet, and it is the equivalent of the gas inlet/overflow return inlet 112 of FIG. 1. It will be noted that an air diffuser 200 having a 70 μm average pore diameter has been installed within the tank 500 in communication with the lower-right fitting 502. Both the air diffuser 200 and the lower-right fitting 502 are installed within a double, internally-threaded coupler 507 that is heat welded into the wall of the tank 500. During operation, the filler cap 503 is removed, and the tank 500 is initially filled about two-thirds to three-fourths full of electrolyte solution. It is filled periodically to restore the initial level of the solution. The air diffuser 200 is very effective diffusing incoming gases into very minute bubbles which enable incoming electrolyte mist and droplets to be absorbed into the electrolyte solution within the tank. After the incoming oxyhydrogen gas bubbles through the electrolyte, it collects in the space above the electrolyte and exits the tank 500 through the upper fitting 504, which is the equivalent of the gas outlet fitting 114 of FIG. 1. The tank 500 has left and right attachment flanges 505L and 505R, respectively, which are integral with the tank 500. Each of the flanges 505L and 505R has four oblong apertures 506, with which the flanges 505L and 505R can be secured, with screws, to a support surface.

Figure 6:
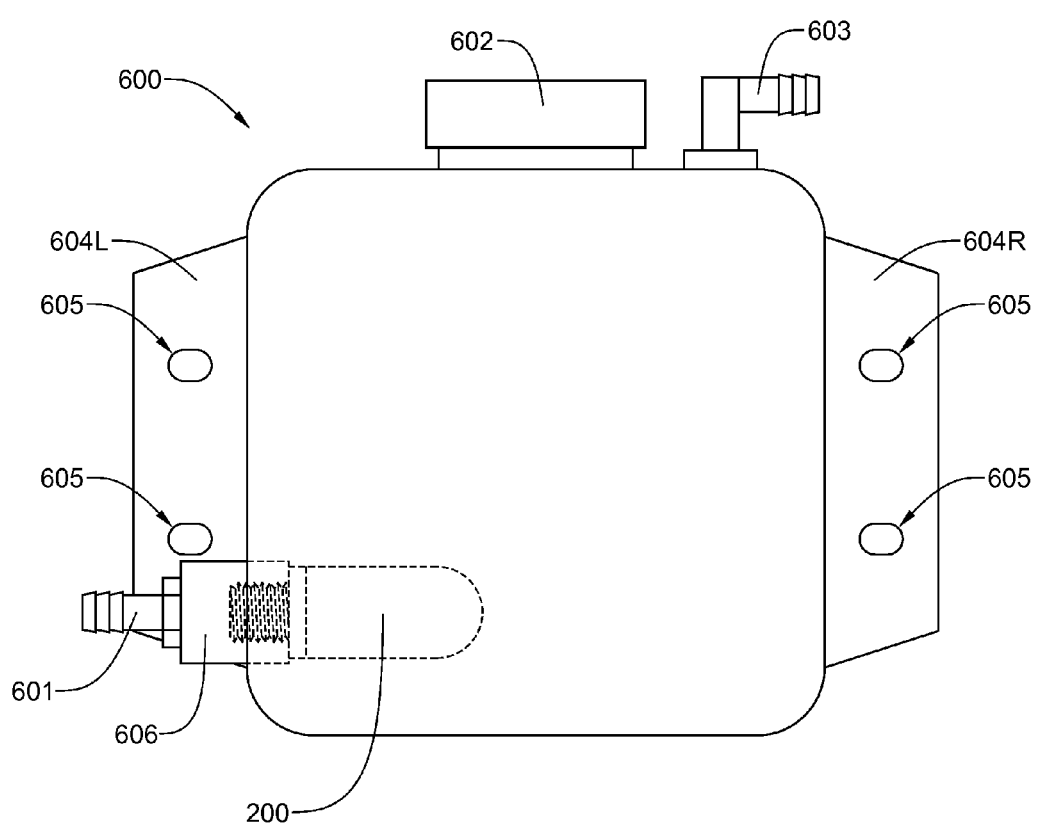
FIG. 6 is an elevational view of a bubbler tank in which the porous polyethylene air diffuser of FIG. 2 has been installed.

Referring now to FIG. 6, a second high-density polyethylene tank 600 is configured as a bubbler tank. The lower-left fitting 601 is the oxyhydrogen gas inlet, and it is the equivalent of the gas inlet 119 of FIG. 1. It will be noted that an air diffuser 200 having a 35 μm average pore diameter has been installed within the tank 600 in communication with the lower-left fitting 601. Both the air diffuser 200 and the lower-left fitting 601 are installed within a double, internally-threaded coupler 606 that is heat welded into the wall of the tank 600. During operation, the filler cap 602 is removed, and the tank 600 the tank is initially filled about two-thirds to three-fourths full of water, which has preferably been purified to remove dissolve minerals. It is refilled periodically to restore the initial fluid level. On a less frequent basis, the water in the second tank 600 is discarded, and the tank 600 is refilled with fresh purified water. The air diffuser 200 is very effective diffusing incoming gases into very minute bubbles which enable any incoming electrolyte mist and droplets to be absorbed into the electrolyte solution within the tank. After the oxyhydrogen gas bubbles through the water, it collects in the space above the water and exits the tank 600 through the upper fitting 603, which is the equivalent of the gas escape fitting 123 of FIG. 1. The tank 600 has left and right attachment flanges 604L and 604R, respectively, which are integral with the tank 600. Each of the flanges 604L and 604R has four oblong apertures 605, with which the flanges 604L and 604R can be secured, with screws, to a support surface.

Use of the ultra-effective porous polyethylene diffusers breaks up the flow of oxyhydrogen gas into microscopic bubbles. The small size of the bubbles enables any steam and trapped electrolyte to be effectively cooled and reclaimed by the solution in the electrolyte supply tank. The diffusers also provide a more uniform and consistent flow of gases into the intake manifold of the engine. The diffusers also act as filters, which remove particulate contaminants from the electrolyte solution. The diffusers are easily replaceable, and can be changed during routine maintenance of the system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention as hereinafter claimed.

What is claimed is:

1. A system for removing electrolyte mist from oxyhydrogen gas generated by an electrolyzer unit before the gas is introduced into the intake manifold of an internal combustion engine, said system comprising:

an electrolyte supply tank partially filled with electrolyte in aqueous solution having an electrolyte outlet coupled to an electrolyte inlet on the electrolyzer unit, an oxyhydrogen gas and electrolyte mist inlet coupled to an oxyhydrogen gas and electrolyte mist outlet on the electrolyer unit, said gas and mist inlet in communication with a first porous high-density polyethylene diffuser that is completely submerged within the electrolyte in aqueous solution, and through which the oxyhydrogen gas and electrolyte mist diffuse, and an intermediate oxyhydrogen gas outlet positioned above an upper surface of the electrolyte; and a bubbler tank filled with water having an oxyhydrogen gas inlet in communication with a second high-density porous polyethylene diffuser that is completely submerged within the water, and through which the oxyhydrogen gas diffuses, and a final oxyhydrogen gas outlet positioned above an upper surface of the water contained within the bubbler tank, from which oxyhydrogen gas is directed to the intake manifold.

2. The system of claim 1, wherein said first porous high-density polyethylene diffuser has an average pore size that is larger than that of said second porous high-density polyethylene diffuser.

3. The system of claim 2, wherein an average pore diameter of said first porous high-density polyethylene diffuser is about 70 μm.

4. The system of claim 2, wherein an average pore diameter of said second porous high-density polyethylene diffuser is about 35 μm.

5. The system of claim 1, wherein each porous high-density polyethylene diffuser is secured to an inside of its respective tank with a threaded connection fitting that engages a threaded aperture in double-threaded coupler that is heat welded within a wall of the respective tank.

6. The system of claim 5, wherein said oxyhydrogen gas and electrolyte mist inlet is secured to an outside of said electrolyte supply tank via said threaded aperture in its wall, and said oxyhydrogen gas inlet is secured to an outside of said bubbler tank via said threaded aperture in said double-threaded coupler.

7. A method for removing electrolyte mist from oxyhydrogen gas generated by an electrolyzer unit before the gas is introduced into the intake manifold of an internal combustion engine, said system comprising the steps of:

providing an electrolyte supply tank partially filled with electrolyte in aqueous solution having an electrolyte outlet that is coupled to an electrolyte inlet on the electrolyzer unit, a first inlet equipped with a first porous, high-density polyethylene diffuser that is submerged in the electrolyte, and an intermediate gas outlet positioned above an upper surface of the electrolyte;

providing a bubbler tank filled with water having a second gas inlet equipped with a second porous, high-density polyethylene diffuser that is submerged in the water, and a final gas out positioned above an upper surface of the water;

directing oxyhydrogen gas produced by the electrolyzer unit that is contaminated with electrolyte mist from said electrolyzer unit into said first inlet, thereby enabling the gas and mist to pass through said first diffuser so that said gas is broken up into very fine bubbles, which rise and break through the upper surface of the electrolyte and collect above the electrolyte within said supply tank and said electrolyte mist is absorbed in the electrolyte contained within the electrolyte supply tank;

directing oxyhydrogen gas that is largely free of electrolyte mist from said intermediate gas outlet to said second gas inlet, thereby enabling the gas that is largely free of electrolyte mist to pass through said first diffuser and break up into very fine bubbles, which rise and break through the upper surface of the water and collect as purified oxyhydrogen gas above the water within said bubbler tank; and directing said purified oxyhydrogen gas to the intake manifold of said internal combustion engine.

8. The method of claim 7, which further includes the step of providing a first porous high-density polyethylene diffuser which has an average pore size that is larger than that of said second porous high-density polyethylene diffuser.

9. The method of claim 8, which further includes the step of providing a first porous high-density polyethylene diffuser which has an average pore size of about 70 μm.

10. The method of claim 8, which further includes the step of providing a second porous high-density polyethylene diffuser which has an average pore size of about 35 μm.

11. The method of claim 7, which further comprises the steps of:

providing each high-density polyethylene diffuser with a threaded connection fitting; and securing each high-density polyethylene diffuser to an inside of its respective tank through engagement of the threaded connection fitting with a double-threaded coupler that is heat welded in a wall of the tank.

12. A system for generating and purifying oxyhydrogen gas for induction into the intake manifold of an internal combustion engine, said system comprising:

an electrolyzer unit having an array of generally parallel, spaced-apart electrodes submersed in an electrolyte in aqueous solution, said electrolyzer having an electrical connection that applies a direct current potential to the endmost electrodes of the array, said electrolyzer having an electrolyte inlet and an oxyhydrogen gas and electrolyte mist outlet;

an electrolyte supply tank partially filled with electrolyte supply in aqueous solution having an electrolyte outlet coupled to said electrolyte inlet, an oxyhydrogen gas and electrolyte mist inlet coupled to the oxyhydrogen gas and electrolyte mist outlet, said gas and mist inlet in communication with a first porous high-density polyethylene diffuser that is completely submerged within the electrolyte supply, and through which the oxyhydrogen gas and electrolyte mist diffuse, and an intermediate oxyhydrogen gas outlet positioned above an upper surface of the electrolyte; and a bubbler tank filled with water having an oxyhydrogen gas inlet in communication with a second high-density porous polyethylene diffuser that is completely submerged within the water, and through which the oxyhydrogen gas diffuses, and a final oxyhydrogen gas outlet positioned above an upper surface of the water contained within the bubbler tank, from which oxyhydrogen gas is directed to the intake manifold.

13. The system of claim 12, wherein said first porous high-density polyethylene diffuser has an average pore size that is larger than that of said second porous high-density polyethylene diffuser.

14. The system of claim 13, wherein an average pore diameter of said first porous high-density polyethylene diffuser is about 70 μm.

15. The system of claim 13, wherein an average pore diameter of said second porous high-density polyethylene diffuser is about 35 μm.

16. The system of claim 12, wherein each porous high-density polyethylene diffuser is secured to an inside of its respective tank with a threaded connection fitting that engages a double-threaded coupler that is heat welded in a tank wall.

17. The system of claim 12, wherein said oxyhydrogen gas and electrolyte mist inlet is secured to an outside of said electrolyte supply tank via said threaded aperture in its wall, and said oxyhydrogen gas inlet is secured to an outside of said bubbler tank via said threaded aperture in the double-threaded coupler.

* * * * *